United States Patent [19]

Mayska et al.

[11] Patent Number: 5,021,543

[45] Date of Patent: Jun. 4, 1991

[54] PROCESS FOR THE PRODUCTION OF BIFUNCTIONAL OH-TERMINATED POLYPHENYLENE OXIDES WITH DIPOLAR APROTIC SOLVENT

[75] Inventors: Paul J. Mayska; Volker Eckhardt; Dieter Freitag; Karsten-Josef Idel, all of Krefeld, Fed. Rep. of Germany

[73] Assignee: Bayer Aktiengesellschaft, Leverkusen, Fed. Rep. of Germany

[21] Appl. No.: 445,275

[22] Filed: Dec. 4, 1989

[30] Foreign Application Priority Data

Dec. 17, 1988 [DE] Fed. Rep. of Germany ....... 3842624

[51] Int. Cl.$^5$ .............................................. C08G 65/44

[52] U.S. Cl. .................................... 528/217; 528/125; 528/128; 528/210; 528/212; 528/214; 528/215; 528/218; 528/219

[58] Field of Search ............... 528/217, 218, 219, 210, 528/212, 214, 215, 125, 128

[56] References Cited

U.S. PATENT DOCUMENTS

4,677,185 6/1987 Heitz et al. .......................... 528/217

*Primary Examiner*—Harold D. Anderson
*Attorney, Agent, or Firm*—Connolly & Hutz

[57] ABSTRACT

The invention relates to a new process for the production of bifunctional polyphenylene oxides bearing OH groups as functional groups at both ends of the chain.

1 Claim, No Drawings

PROCESS FOR THE PRODUCTION OF BIFUNCTIONAL OH-TERMINATED POLYPHENYLENE OXIDES WITH DIPOLAR APROTIC SOLVENT

This invention relates to a new process for the production of bifunctional polyphenylene oxides bearing OH groups as functional groups at both ends of the chain.

Various processes for the production of polyphenylene ethers (polyphenylene oxides) are known.

The production of OH-terminated polyphenylene ethers is known, cf. for example DE-A 3 340 493, DE-A 3 308 421, DE-A 3 505 142.

It is known from DE-A 3 340 493 that polyphenylene oxides terminated by an OH group at either end of the chain can be obtained by reaction of bisphenols with halophenols in the presence of an oxidizing agent.

It is known from DE-A 3 308 421 that bifunctional polyphenylene oxides terminated by an OH group at either end of the chain can be produced by oxidation of bisphenols with phenols containing only one OH group in the presence of catalysts using oxygen as the oxidizing agent.

The present invention relates to a process for the production of bifunctional polyphenylene ethers (polyphenylene oxides) terminated by a hydroxyl group at either end of the chain corresponding to formula (I)

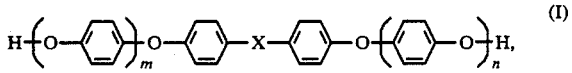

in which
X is a group

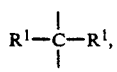

where $R^1$ is hydrogen or a $C_1$-$C_{10}$ alkyl radical, —CO—, S, —O—,

or —SO$_2$—, 3,3,5-trimethyl cyclohexylidene, isopropylidene,
m and n independently of one another represent an integer of from 5 to 60,
characterized in that a mixture of phenols corresponding to formulae (II) and (III)

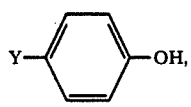

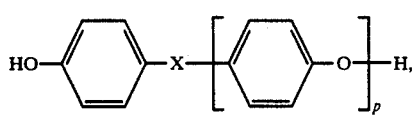

in which

X is as defined for formula (I) and
Y represents halogen, such as Cl, Br or I,
p is the number 1 and, where X is O (oxygen), p may additionally be the number zero (0)
is reacted in the presence of Cu(I).halide such a CuCl CuBr, at a temperature in the range from −80° C. to 250° C. in a dipolar aprotic solvent selected from the group consisting of DMI (N,N'-dimethyl imidazolidin-2-one) NMC (N-methyl caprolactam), NMP (N-methyl pyrrolidone), diphenyl sulfone and DMSO (dimethyl sulfoxide).

The process according to the invention does not require the otherwise usual addition of amines as cocatalyst. An alkali hydroxide, such as NaOH, KOH, may advantageously be used.

From 1 to 2 equivalents metal hydroxide, preferably an alkali hydroxide, such as NaOH, KOH, preferably in aqueous solution, are added to the reaction mixture per equivalent of phenolic OH group. It is preferred to use concentrated (for example 10 to 50% by weight) aqueous hydroxide solutions. Through the addition of the metal hydroxides, the phenols can be converted into the 1metal phenolates.

Suitable bisphenols are, for example, hydroquinone, 2,2-bis-(4-hydroxyphenyl)-propane (bisphenol A), 4,4'-dihydroxydiphenyl ether (DOD ether) 4,4'-dihydroxydiphenyl, bis-(4-hydroxyphenyl)-3,3,5-trimethyl cyclohexane (HIP bisphenol), etc. 4,4'-Dihydroxydiphenyl ether is preferably used.

The reaction is preferably carried out at temperatures in the range from 150° C. to 350° C. and more preferably at temperatures in the range from 170° C. to 200° C.

Compounds which have a branching effect, such as for example 1,3,5-trihydroxybenzene (phloroglucinol), 1,3,5-tribromobenzene, 1,3-dibromo-5-hydroxybenzene, may optionally be present during the preparation of the oligo- or polyphenylene oxides The use of these compounds has an effect on the functionality of the oligo- or polyphenylene oxides.

4-Chlorophenol, 4-bromophenol, etc., may be used as the halophenols corresponding to formula (I).

The bifunctional polyphenylene oxides produced in accordance with the invention may be reacted to block copolymers in the same way as described in DE-A 3 505 142.

EXAMPLES

EXAMPLE 1

Preparation of a dihydroxyl-functional oligophenylene oxide 25.95 g (0.15 mol) p-bromophenol, 7,58 g (0.0375 mol, 25 mol-%) 4,4'-dihydroxydiphenyl ether (DOD ether), 80 g N,N'-dimethyl imidazolidin-2-one (DMI), 100 ml toluene and 31.56 g (0.225 mol) 40% potassium hydroxide are introduced under nitrogen into a 500-ml three-necked flask equipped with a stirrer, thermometer, water separator and reflux condenser and are refluxed until all the water has been removed from the system. 120 mg Cu(I)Cl are added at 150° C., followed by heating to 195° C. The mixture is then kept at 195° C. for 4 hours and, after cooling, is precipitated in 5% hydrochloric acid. The product is filtered off under suction and washed with distilled water until neutral. It is then refluxed for 2 hours in a mixture of hydrochloric acid and methanol (2:1), washed until neutral and dried. Yield: 80%. Mp.: 157° C. Total bromine: <0.02%. Inorganic bromine: <30 ppm.

The molecular weight distribution of the product was characterized by high-temperature gel chromatography: $M_w = 2159$ g/mol, $M_n = 1310$ g/mol, $U_1 = 0.65$.

EXAMPLE 2

Production of a dihydroxyl-functional oligophenylene oxide of relatively high molecular weight:

The following components were weighed into the apparatus described in Example 1 and reacted by the process described therein: 25.95 g (0.15 mol) p-bromophenol, 3.03 g (0.015 mol, 10 mol-%) DOD ether, 28.41 g (0.18 mol) 40% potassium hydroxide, 80.00 g DMI, 100 ml toluene, 120 mg Cu(I)Cl. Yield: 82%. Mp.: 180° C. Total bromine: 0 35%. Inorganic bromine: <0.01%.

The molecular weight distribution of the product was characterized by high-temperature gel chromatography: $M_w = 3600$ g/mol, $M_n = 1642$ g/mol, $U_1 = 1.19$.

EXAMPLE 3

Preparation of a dihydroxyl-functional oligophenylene oxide with bisphenol A in NMP as solvent 16.09 g (76.2 mmol) potassium bromophenolate, 2,32 g (7.62 mmol) of the dipotassium salt of 2,2-bis-(4-hydroxyphenyl)-propane (BPA-dipotassium salt) and 60 mg copper (I) chloride are weighed under nitrogen into a 100 ml three-necked flask heated three times in an oil pump vacuum and filled with nitrogen. The stirrer sleeve with a KPG stirrer is then put on in a countercurrent of nitrogen, after which the flask is evacuated and purged with nitrogen another three times. 40 ml anhydrous, oxygen-free N-methyl pyrrolidone (2) is then added and the flask immersed in the hot (190° C.) salt melt. A dark brown colored homogeneous solution is obtained, a solid precipitating therefrom after about 10 minutes. The contents of the flask are then stirred for 6 hours at a bath temperature of 190° C. (internal temperature 170° C.). After cooling to 100° C., the product is precipitated in 600 ml 0.2N aqueous hydrochloric acid and washed repeatedly with water. After drying, the crude product is dissolved while heating in 50 ml DMF and precipitated in 600 ml water. The product is filtered off and dried over $P_2O_5$ at 80° C. in an oil pump vacuum. Yield: 71%. $M_n = 784$ g/mol (vapor pressure osmometry

EXAMPLE 4

Determination of functionality—reaction with bromobenzene sulfonic acid chloride 542.1 mg (0.691 mmol) poly(oxy-1,4-phenylene) (Example 3, $M_n = 784$, as determined by vapor pressure osmometry), 883.3 mg (3.457 mmol) 4-bromobenzene sulfonic acid chloride and 20 ml anhydrous, oxygen-free pyridine (pyr) are introduced into a 50 ml nitrogen flask with a reflux condenser, which has been heated in an oil pump vacuum and filled with nitrogen three times, and heated to the boiling temperature. The polymer is completely dissolved. After refluxing for 4 hours, the reaction mixture is cooled to room temperature and the product is precipitated in 100 ml methanol. It is then filtered off, washed with methanol and water and dried over $P_2O_5$ at 80° C .in an oil pump vacuum. The crude product is dissolved in 20 ml DMF and precipitated from 100 ml methanol. After repeated washing with methanol and water, the product is dried over $P_2O_5$ at 80° C. in an oil pump vacuum (yield: 394.1 mg).

The bromine content of the esterified poly(oxy-1,4-phenylene) is 9.90% (starting polymer: 0.33%) and its molecular weight $M_n$ 1282. An OH functionality of 1.5 is calculated for the starting polymer from the difference in the bromine contents in accordance with equation 1:

$$f = \frac{M_n \cdot (X_F\% - X_E\%)}{100\% \cdot 79.904 \text{ g/mol}} \quad \text{Equation 1:}$$

$M_n$ = molecular weight of the esterified polymer, as determined by vapor pressure osmometry
$X_E$ = bromine content of the starting polymer
$X_F$ = bromine content of the esterified polymer

EXAMPLE 5

Reaction of a dihydroxyl-functional oligophenylene oxide with terephthaloyl chloride 4.0 g (3.490 mmol) poly(oxy-1,4-phenylene), $M_n = 1146$ g/mol; functionality = 1.9, 0.6731 g (3.3155 mmol) terephthaloyl chloride and 50 ml molten diphenyl ether are introduced into a 100 ml three-necked flask heated three times in an oil pump vacuum and filled with nitrogen. A reflux condenser with a bubble counter is then put on in a countercurrent of nitrogen, followed by purging with nitrogen for 1 hour. The reaction mixture is then heated to the boiling temperature, the solid being completely dissolved. The mixture is then refluxed until there is no further elimination of hydrochloric acid (litmus paper turns red). The reaction mixture remains homogeneous throughout the entire reaction time of 48 hours. After cooling to 100° C., the product is precipitated in 600 ml methanol, filtered off, washed repeatedly with methanol and then dried over $P_2O_5$ at 80° C. in an oil pump vacuum. Yield: 80.4%. Average molecular weight $M_n = 32$-3 g/mol (as determined by vapor pressure osmometry).

We claim:

1. A process for the production of bifunctional polyphenylene ethers (polyphenylene oxides) terminated by a hydroxyl group having the formula (I)

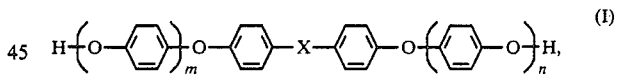

in which
X is a group

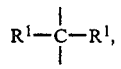

where $R^1$ is hydrogen or a $C_1$-$C_{10}$ alkyl radical, —CO—, S, —O—,

or —$SO_2$—, 3,3,5-trimethyl cyclohexylidene, isopropylene,
m and n independently of one another represent an integer of from 5 to 60,
wherein a mixture of phenols corresponding to formulae (II) and (III)

(II) 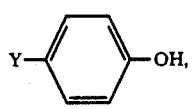

(III) 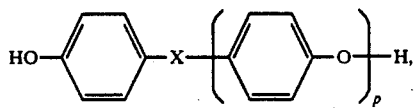

in which

X is as defined for formula (I) and
Y represents halogen,
p is zero or 1 and, X is O (oxygen)
is reacted in the presence of Cu(I) halide at a temperature in the range from −80° C. to 250° C. in a dipolar aprotic solvent selected from the group consisting of DMI (N,N'-dimethyl imidazolidin-2-one), NMC (N-methyl caprolactam), NMP (N-methyl pyrrolidone), diphenyl sulfone and DMSO (dimethyl sulfoxide).

* * * * *